United States Patent
Martin et al.

(10) Patent No.: US 9,489,520 B2
(45) Date of Patent: Nov. 8, 2016

(54) DECRYPTION AND ENCRYPTION OF APPLICATION DATA

(75) Inventors: Robert P Martin, Fort Collins, CO (US); Roland M Hochmuth, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/347,550

(22) PCT Filed: Sep. 29, 2011

(86) PCT No.: PCT/US2011/054078
§ 371 (c)(1),
(2), (4) Date: Mar. 26, 2014

(87) PCT Pub. No.: WO2013/048418
PCT Pub. Date: Apr. 4, 2013

(65) Prior Publication Data
US 2014/0237255 A1    Aug. 21, 2014

(51) Int. Cl.
| | | |
|---|---|---|
| *G06F 21/60* | (2013.01) | |
| *G06F 21/62* | (2013.01) | |
| *G06F 21/64* | (2013.01) | |
| *G11B 20/00* | (2006.01) | |
| *G06Q 20/12* | (2012.01) | |
| *G06F 21/12* | (2013.01) | |
| *G06F 21/10* | (2013.01) | |

(52) U.S. Cl.
CPC ......... *G06F 21/602* (2013.01); *G06F 21/6209* (2013.01); *G06F 21/64* (2013.01); *G06F 21/10* (2013.01); *G06F 21/12* (2013.01); *G06F 21/125* (2013.01); *G06F 2221/2107* (2013.01); *G06Q 20/123* (2013.01); *G06Q 20/1235* (2013.01); *G11B 20/0021* (2013.01); *G11B 20/00246* (2013.01); *G11B 20/00478* (2013.01)

(58) Field of Classification Search
CPC ...... G06F 21/10; G06F 21/12; G06F 21/125; G06F 21/602; G06Q 20/123; G06Q 20/1235; G11B 20/0021; G11B 20/00246; G11B 20/00478

See application file for complete search history.

(56) References Cited

U.S. PATENT DOCUMENTS

| 7,124,445 B2 | 10/2006 | Cronce et al. |
| 7,263,722 B1 * | 8/2007 | Luo ....................... G06F 21/125 713/164 |

(Continued)

FOREIGN PATENT DOCUMENTS

| CN | 1571999 A | 1/2005 |
| CN | 1780361 A | 5/2006 |

(Continued)

OTHER PUBLICATIONS

ISR/WO, PCT/US2011/054078, HP reference 82828066, Mar. 20, 2012, 9 pps.

*Primary Examiner* — Morshed Mehedi
*Assistant Examiner* — Vance Little
(74) *Attorney, Agent, or Firm* — HP Inc Patent Department

(57) ABSTRACT

Examples disclose providing a decryption, validation and encryption process. Specifically, disclosure includes decrypting a first encrypted application data to then validate its integrity. Disclosure also includes encrypting the decrypted application data using a technique different from that used to provide the first encrypted application data and then storing the encrypted application data.

9 Claims, 6 Drawing Sheets

(56) References Cited

U.S. PATENT DOCUMENTS

| | | | |
|---|---|---|---|
| 7,925,250 B2 | 4/2011 | Redpath | |
| 7,930,537 B2 | 4/2011 | Paatero | |
| 2001/0047447 A1* | 11/2001 | Katsuda | G06F 8/60 711/1 |
| 2002/0169972 A1* | 11/2002 | Tanaka | G11B 20/00086 713/193 |
| 2003/0009681 A1* | 1/2003 | Harada et al. | 713/193 |
| 2004/0037423 A1 | 2/2004 | Ghanea-Hercock | |
| 2006/0242702 A1 | 10/2006 | McIntosh et al. | |
| 2006/0265603 A1 | 11/2006 | McLean et al. | |
| 2007/0089090 A1 | 4/2007 | Riedl et al. | |
| 2007/0220610 A1* | 9/2007 | Van Loenen | G06F 21/10 726/26 |
| 2008/0040609 A1* | 2/2008 | Giobbi | G06F 21/10 713/182 |
| 2008/0092210 A1* | 4/2008 | Tobita | G06F 21/572 726/2 |
| 2008/0148400 A1 | 6/2008 | Barron et al. | |
| 2009/0172401 A1* | 7/2009 | Cizas | G06F 21/76 713/169 |
| 2009/0296940 A1* | 12/2009 | Moroney | G06F 21/10 380/278 |
| 2011/0213962 A1* | 9/2011 | Pestoni | G06F 21/10 713/156 |

FOREIGN PATENT DOCUMENTS

| | | |
|---|---|---|
| CN | 101005699 A | 7/2007 |
| EP | 1492105 | 12/2004 |
| EP | 1536308 | 1/2005 |
| WO | WO-2008100030 | 8/2008 |

\* cited by examiner

DECRYPTION AND ENCRYPTION OF APPLICATION DATA

BACKGROUND

Application programs have become more numerous in computing technology. Users of computing devices rely on these applications to run many aspects of their day to day life. However, since these applications have increased their presence, there are security concerns for the applications on the computing devices.

One concern is the applications may have viruses or other sort of infections. For example, before or during downloading and installation of an application on a computing device, it may be susceptible to malicious software, viruses, and other sort of tampering. The computing device in turn may be exposed to these defects in the application and become corrupted.

Another concern is an unauthorized user may view and/or copy unprotected code in an application to gain access to the application. Further, the unauthorized viewer may transfer to other unauthorized users. During download or prior to or subsequent to execution of the application, code within the application may be viewable to others who can copy the code and/or transfer to a user who is not authorized to use the application.

Existing security implementations fail to provide for application protection against tampering, malicious software, and unauthorized user access.

BRIEF DESCRIPTION OF THE DRAWINGS

In the accompanying drawings, like numerals refer to like components or blocks. The following detailed description references the drawings, wherein.

DETAILED DESCRIPTION

As detailed above, an unauthorized user may gain access to an application on a computing device by viewing related application files, such as the source code. For example, in a mobile computing device environment, security tends to maintained and well-defined. However, in a desktop environment a user may not be authorized to view the source code in an application and may easily be granted administrator privileges, such as viewing the source code of the application. Unauthorized access to an application may also be further problematic if the related application files have been tampered with as it may also corrupt the computing device.

To address these issues, various examples disclosed herein prevent unauthorized access to application data to help prevent the corruption of the computing device. The application data includes at least one file related to the application, such as a configurable file, executable file, media, library, source code, or metadata. In particular, examples provide a computing device to receive a first encrypted application data from a trusted source. The computing device may then decrypt the first encrypted application data to validate the integrity of the data. Additionally, the computing device may encrypt the decrypted application data, with a different technique than the first encrypted application data to then store in a memory. In one embodiment, the first encrypted application data may be encrypted using a cryptographic algorithm and the different technique may use a key to encrypt the decrypted application data and vice versa. In a further embodiment, the first encrypted application data may be encrypted using a key while the decrypted application data may be encrypted using a different key.

In this manner, the validation of integrity of the decrypted application data is used to verify there has been no tampering, or alteration of the application data that may corrupt the application and/or the computing device. Additionally, using another decryption and encryption with different techniques than the first encryption of the application data prevents unauthorized access, copying, and viewing of the application data. In both of these instances, security is provided to the application data and the computing device.

Figure 1:
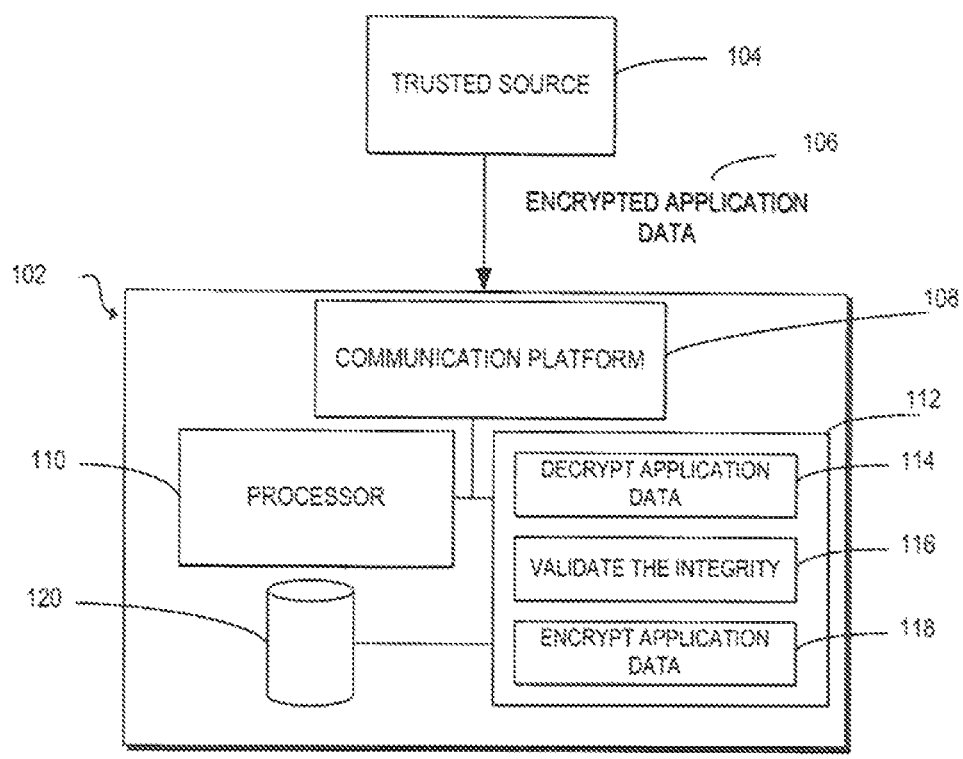
FIG. 1 is a block diagram of an example computing device for receiving an encrypted application data.

Referring now to the drawings, FIG. 1 is a block diagram of an example computing device 102 for receiving an encrypted application data 106 from a trusted source 104. Computing device 102, for example, may include a client device, personal computer, laptop, mobile device, portable device, or any other computing device suitable to receive encrypted application data 106. Further, it is to be understood although the computing device includes the depicted components, it should not be limited to containing the components illustrated in FIG. 1. For example, the computing device 102 may further include an additional processor and/or storage area, etc.

Trusted source 104 transmits the encrypted application data 106 to the computing device 102. Specifically, a communication platform 108 at the computing device 102 receives the encrypted application data 106. The trusted source 104 may include a networking server, application database, a web server, file server, or any other computing device suitable for sending the encrypted application data 106. The trusted source 104 may encrypt the encrypted application data 106 using a first encryption. In one embodiment, the trusted source 104 verifies the computing device 102 prior to sending the encrypted application data 106 using a certificate exchange, or user id and password exchange between the computing device 102 and the trusted source 104. In this sense, the trusted source 104 and the computing device 102 are verified to each other as trusted. Additionally, the trusted source 104 may encrypt the application data to produce the encrypted application data 106 prior to transmission. The encryption technique may include a cryptographic function or other encryption process to transform information.

The communication platform 108 on the computing device 102 receives the encrypted application data 106. The communication platform 108 may include a network interface, a network communication, or other communication network that is suitable to connect the computing device 102 to a trusted source 104.

The encrypted application data 106 includes a file associated with the application, such as an executable file, configurable file, media, library, metadata, source code, or other type of related application file. Further, the encrypted application data 106 may include some combination of an executable file, configurable file, media, library, metadata, source code, etc. The application includes all necessary files for a program to perform a specific task, such as a document editing application, media application, web browser, gaming application, etc. In this instance, the encrypted application data may be a smaller size than the application. For example, the application data may include the source code related to a game application for a user to play a game, which is encrypted before being sent to the computing device 102, while the application may contain all files necessary for the user to play the game, such as the executable files, configurable files, etc. Further embodiments of the encrypted application data 106 include an application file, application information, component of the application, application software, or other portion of the application.

In one example, the encrypted application data may be sent to the processor 110 while in another example, it may be sent to the machine-readable storage medium 112. While in a further example, the processor 110 may retrieve the encrypted application data 106 from the communication platform 108. Yet, in a further embodiment, the communication platform 108 sends the encrypted application data 106 to the processor 110.

Processor 110 decrypts application data 114, validates the integrity 116 of the application data, and then encrypts application data 118 to place it in the storage area 120. The processor 110, by way of example, may comprise a central processing unit (CPU), microprocessor, or other programmable device suitable to decrypt, validate, and encrypt an application data.

Machine-readable storage medium 112 includes executable instructions, firmware, and/or software modules which can be executed by the processor to: decrypt application data 114, validate the integrity 116, and encrypt application data 118. The machine-readable storage medium 112 may be an electronic, magnetic, optical, flash-drive, or other physical device that contains or stores executable instructions. Thus, machine-readable storage medium 112 may be, for example, Random Access Memory (RAM), an Electrically Erasable Programmable Read-Only Memory (EEPROM), a storage drive, a Compact Disc Read-Only Memory (CDROM), and the like. As such, the machine-readable storage medium 112 may be non-transitory. In other embodiments, the computing device 102 can include an application and/or firmware which may be utilized independently and/or in conjunction with the processor 110 to fetch, decode, and/or execute the instructions 114, 116, and 118 on the machine-readable storage medium 112 and/or stored on another location of the computing device 102. In a further embodiment, machine-readable storage medium 112 includes 114, 116, and 118, it may further include additional instructions.

The processor 110 decrypts the encrypted application data 106 to produce a decrypted application data. The processor 110 may use a decryption key, decryption program, or other decryptographic function suitable to decrypt the encrypted application data 106.

The decrypted application data produced is used by the processor 110 to validate the integrity 116 of the decrypted application data. In one embodiment, the processor 110 validates the integrity of the decrypted application data using a checksum program, checksum function, cryptographic hash function, or other type of integrity check function. In another embodiment, the processor 110 can validate the integrity of the decrypted application by computing a data value from the application data and comparing it to a stored value on the computing device 102 or on a remote storage location, such as the trusted source 104. For example, after decrypting the encrypted application data 106, the processor ciphers a hash value such as "18$#," this value is then compared against previously computed hash functions representing the specific application program and other application programs. Comparing the "18$#" value and to a corresponding hash value ensures there has been no tampering with the application data.

After the decrypted application data is validated, the processor 110 proceeds to re-encrypt the application data using an encryption technique different from the encryption technique by the trusted source 104 to encrypt the application data 106. In this sense, the encryption technique used to produce 106 is the first encryption while the encryption used at 118 is considered a second encryption. For example, the first encryption may be use a cryptographic function, while the second encryption may use a private key to encrypt the application data. A further example, the first encryption may include the trusted source using a key to encrypt the application data and the second encryption uses a different key. In another embodiment, the user of the computing device 102 or the computing device can encrypt the application data 118. In this embodiment, encrypting the application data can include using a private key that is a key specific to the user of the computing device or a private key specific to that computing device. Since the encryption technique used prior to transmission of the encrypted application file 106 is considered the first encryption and the encryption method used at 118 is a second encryption method, the encrypted application data is referred to as a first encrypted application data and a second encrypted application data, respectively. Once the second encrypted application data is generated, the second encrypted application data is stored by the processor 110 on storage area 120.

Storage area 120, by way of example, may include a memory, storage, or a number of physical media for storing data. For example, storage area 120 may include one or more hard disks, solid state drives, tape drives, flash drives, nanodrives, holographic storage devices, or any combination of such storage devices.

Figure 2:
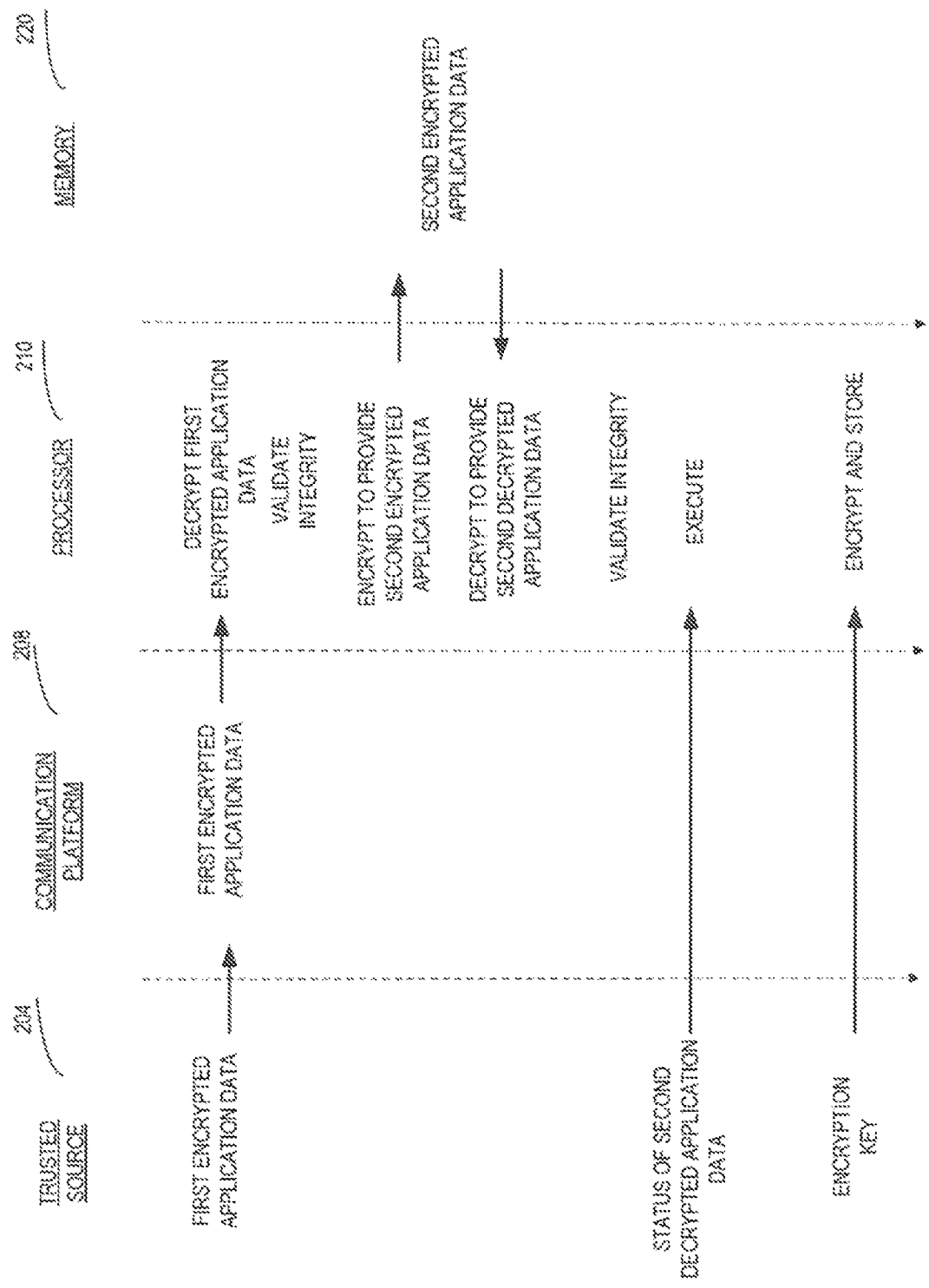
FIG. 2 is a communication diagram of an example communication that may occur between the computing device and the trusted source.

FIG. 2 depicts communication that occurs between a trusted source 204, communication platform 208, processor 210, and memory 220. As noted above, the communication platform 208, the processor 210, and the memory 220 are components included in the computing device 102. In this sense, FIG. 2 depicts communication between the trusted source 204 and the computing device 102.

The trusted source 204 transmits or sends a first encrypted application file to the communication platform 208. Trusted source 204 may include a network communication that is suitable to communicate with a computing device, such as a wireless area network, Bluetooth, etc. As discussed earlier, the first encrypted application data may include at least a file associated with the application such as an executable file, configurable file, media, library, metadata, source code, or other type of related application file. In one embodiment, the trusted source 204 can also transmit an encryption key to a computing device which is encrypted and stored. In another embodiment, the trusted source 204 sends the encryption key after the first encrypted application data, while in a further embodiment the trusted source 204 sends the encryption key before the first encrypted application data. In these embodiments, the encryption key is used to decrypt the first encrypted application data by the processor 210.

The communication platform 208 receives the first encrypted application data for the processor 210 to decrypt.

The communication platform 208, by way of earlier example, comprises a network interface, a network communication, or other communication network that is suitable to connect the computing device to the trusted source 204. For example, the communication platform 208 may include a wireless local area network, wireless radio, Bluetooth, or other wired or wireless communication to communicate with the trusted source 204.

The processor 210 decrypts the first encrypted application data to validate the Integrity of the first decrypted application data. After validating its integrity, the processor 210 encrypts the first decrypted application data which produces the second encrypted application data to store in memory 220. In one embodiment, an encryption key sent by the trusted source 204 is used to decrypt the first encrypted application data by the processor 210, encrypted and stored with the second encrypted application data at the memory 220. For example, the processor 210 decrypts the first encrypted application data using the encryption key. As explained earlier, the decrypted application data is used to compute a hash value to validate its integrity by using a checksum program, checksum function, cryptographic hash function, or other type of integrity check function. In one embodiment, the processor 210 can validate the integrity of the decrypted application data by computing a data value from the application data and comparing it to a stored value on the computing device or on the trusted source 204. For example, after decrypting the encrypted application data, the processor 210 ciphers a hash value such as "18$#," this value is then compared against other previously computed hash functions representing the specific application program and other application programs. Comparing the "18$#" value to a corresponding hash value ensures there has been no tampering with the application data. If the hash value corresponds to a previously computed hash value, it ensures the integrity of the application data, in that, there has been no tampering. The first decrypted application data and encryption key is then re-encrypted by the processor using a different technique than that which was used to produce the first encrypted application data. This generates the second encrypted application data. Then, the second encrypted application data and encrypted encryption key are stored in the memory 220.

The memory 220 stores the second encrypted application data. The memory 220, by way of example, may include a storage area, storage, or other type of storage suitable to store an encrypted application data. For example, the memory may operate in conjunction with a storage medium, a processor, or as a stand-alone component. As discussed earlier, in another embodiment, the memory 220 may also store the encryption key. The processor 210 may retrieve the second encrypted application data from the memory 220 to check the integrity. During this process, the processor 210 retrieves the second encrypted application data to decrypt it which provides a second decrypted application data. In one embodiment, the processor 210 additionally validates the integrity of the second decrypted application data to ensure there has been no malicious tampering. In this instance, the additional validation of the integrity of the second decrypted application file ensures there has been no tampering to the second decrypted application data while in the memory 220. Once the integrity of the second decrypted application file has been validated, a status of the second decrypted application data may be transmitted from the trusted source 204 to processor 210. Examples of the status can include a recall, requires update, hold, execute, and/or any other type of application status to indicate the state of the second decrypted application data. For example, the processor may receive a status to hold the second decrypted application data at which point, the processor 210 will not execute until receiving a status to do so. In this sense, the processor 210 is dependent on the status of the second encrypted application data in order to execute it.

If the processor chooses to launch the second encrypted application data, the processor 210 retrieves the second encrypted application data from the memory 220 to decrypt it which provides a second decrypted application data. The processor 210 then validates the integrity of the second decrypted application data, and receives an update status such as to continue with execution of the application program. The processor 210 can then execute the second decrypted application data.

Figure 3:
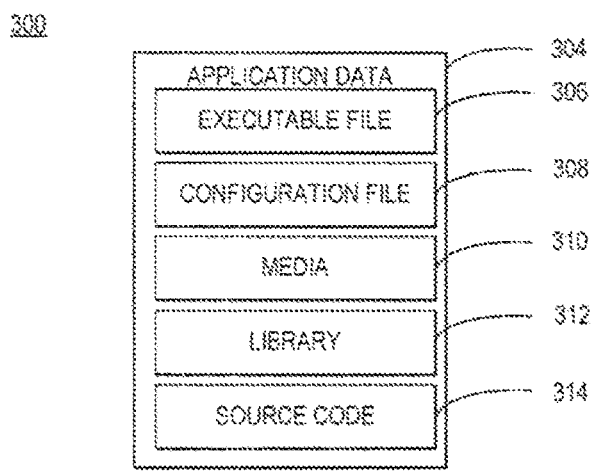
FIG. 3 is block diagram of an example application data.

Moving to FIG. 3, a block diagram 300 depicts an example application data 304. Specifically, the block diagram 300 depicts the application data 304 may include an executable file 306, configuration file 308, media 310, library 312 and/or source code 314. For example, the application data 304 may contain an executable file 306 or more than one configuration file 308 and more than one executable files 306 and/or metadata. Additionally, block diagram 300 depicts application data irrespective of encryption or decryption, in this sense, the application data 304 may be encrypted or decrypted application data.

The application data 304 may either be encrypted or decrypted while on a computing device. As discussed earlier, examples of the application data 304 include an application file, application information, component of the application, application software, or other portion of the application and as such may be used Interchangeably throughout the document. Although FIG. 3 depicts application data 304 including the executable file 306, configuration file 308, media 310, library 312, metadata, and/or source code 314, this should not be limiting as there may be other type of software application information that may be included but is not depicted in FIG. 3. In this manner, the application data 304 can include one or more related files to an application to download, launch and/or execute on a computing device. As noted above, the trusted source, transmits an encrypted application data 304 to a computing device. The encrypted application data 304 may be the application data in encrypted form and include any one or combination of 306, 308, 310, 312, and 314. The encrypted application file 304 is received at the computing device where it may be decrypted. Additionally as described earlier, a processor may execute the application data, this may include any one or combination of 306, 308, 310, 312, and 314.

Figure 4:
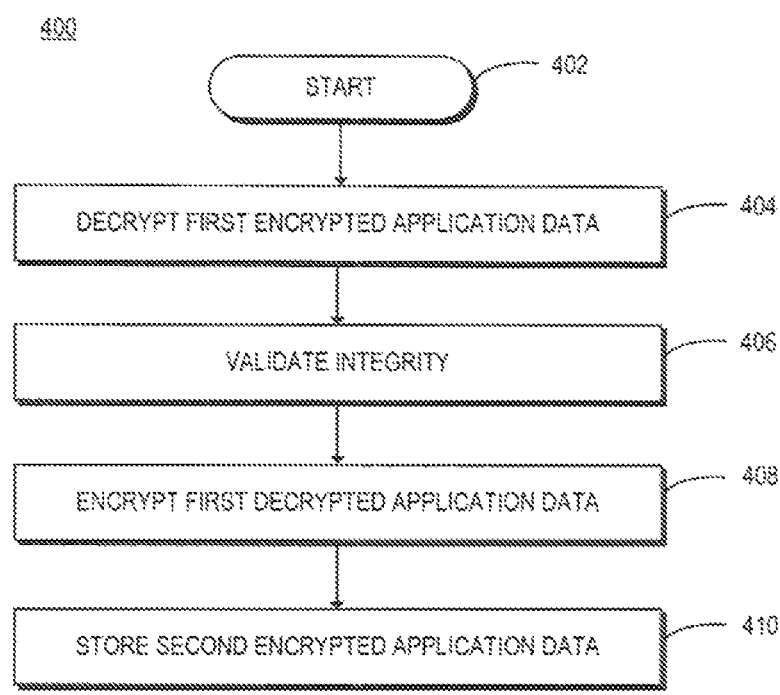
FIG. 4 is a flowchart of an example method performed on a computing device for storing a second encrypted application data.

Referring now to FIG. 4, a flowchart of an example method 400 performed on a computing device for storing a second encrypted application data. Although execution of method 400 is described with reference to elements of FIG. 1, other suitable components will be apparent to those skilled in the art. Method 400 may be implemented in the form of executable instructions stored on a machine-readable storage medium, such as storage medium 112, or in the form of electronic circuitry.

At start 402, a trusted source transmits a first encrypted application data. At step 402, for example, a computing device may authenticate itself to a trusted source and vice versa. In one embodiment, the trusted source can encrypt the application data prior to transmission or during transit to produce the first encrypted application data for the computing device to receive. A communication platform of the computing device receives the first encrypted application data at step 404.

Next, at step 404, first encrypted application data is decrypted by to generate a first decrypted application data. At step 404, the processor uses a decryption method to generate the first decrypted application data. Step 404 may use a decryption technique, decryption key, decryption program, or other decryptographic function suitable to complete step 404. A further example of step 404 provides for receiving an encryption key by the trusted source, using it to decrypt the first encrypted application data, encrypting the encryption key, and further storing the encryption key on the computing device. Yet, a further example of step 404 includes only a portion of the first encrypted application data decrypted. Further still, another example of step 404 includes decryption of the first encrypted application data, into a system file that is non-viewable to a user of a computing device. For example, step 404, decrypts the first encrypted application data into a non-viewable memory or cache. Specifically, this memory is not viewable to a user of a computing device to prevent the decrypted application data from being copied and/or transferred.

At step 406, the processor validates the integrity of the first decrypted application data. Step 406, as explained earlier, a processor uses a checksum function, checksum program, cryptographic hash function, or other type of integrity check function to compute a hashing value to validate the integrity of the first decrypted application data. In one embodiment, the processor can validate the integrity of the decrypted application data by computing a data value from the decrypted application data and comparing it to a previously computed stored hash value of the decrypted application data on the computing device or on the trusted source. For example, after the processor ciphers a hash value, this value is compared against other previously computed hash values representing the specific application program and other application programs to validate the integrity of the first decrypted application data. In a further example, a decrypted first encrypted application data hashing value may be "89&*?!" so during this step, a computing device, such as 102 in FIG. 1, may try find a corresponding previously computed hash value in a database or catalog to validate the integrity of the first decrypted application data. The database or catalog may be located on the device or on a remote storage location, such as the trusted source. In this sense, the processor validates there has been no tampering of the application data. In one embodiment, if there is no validation of the integrity of the first decrypted application data, the application data will not launch or execute. In another embodiment, the application data may be erased from the computing device.

At step 408, the processor encrypts the first decrypted application data. Additionally, the processor uses an encryption technique or method that is different from the encryption technique or method used by the trusted source to encrypt the first encryption application data to generate a second encrypted application data. In this sense, the first encryption data received at step 402 or step 404 is encrypted with a first encryption technique while the encryption technique at step 408 is a second encryption technique. For example, the first encryption may be use a cryptographic function, while the second encryption may use a private key to encrypt the application data. In a further example, the first encryption may include the trusted source using a key to encrypt the application data and the second encryption uses a different key in another embodiment, the second encryption technique includes using a key that is specific to a user of a computing device or to the computing device. In this manner, the encryption technique is based on at least the user of a device or the computing device.

At step 410, the second encrypted application data is stored. For example, as seen in FIG. 1, the second encrypted application data is stored in storage area 120.

Figure 5:
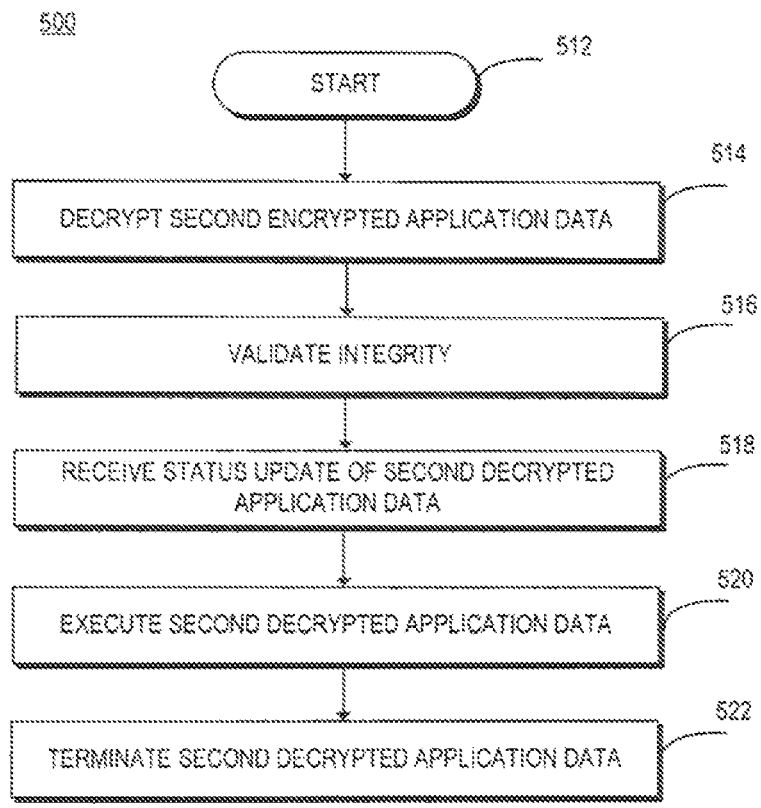
FIG. 5 is a flowchart of an example method performed on a computing device to execute a second decrypted application data.

Referring now to FIG. 5, a flowchart of an example method 500 performed on a computing device to execute a second encrypted application data. Further, the method 500 provides a termination of the second encrypted application data. Although execution of method 500 is described with reference to elements of FIG. 1, other suitable components will be apparent to those skilled in the art. Method 500 may be implemented in the form of executable instructions stored on a machine-readable storage medium, such as storage medium 112 or in the form of electronic circuitry.

By way of further example, step 512 is a continuance of method 400 in FIG. 4 and begins after step 410 storing the second encrypted application data. At step 512, the processor retrieves the second encrypted application data from a storage area. In another embodiment, a user can issue a request for the processor to retrieve the second encrypted application.

Next, at step 514, the second encrypted application data is decrypted to generate a second decrypted application data. Step 514, by way of example, may decrypt the second encrypted application data using a decryption technique, key, program, or other decryptographic function suitable to complete step 514. By way of further example, step 514 decrypts the second encrypted application data into a non-viewable memory or cache. Specifically, this memory is not viewable to a user of a computing device. In this sense, the application data is prevented from being copied.

At step 516, the second decrypted application data as generated at step 514 is used to validate the integrity. The validation of the integrity ensures there has been no tampering of the second encrypted application data in the memory. Step 516, by way of example, computes a hash value by using a cryptographic hash function. Specifically, the second decrypted application data is used to compute a hash value to validate its integrity by using a checksum program, checksum function, cryptographic hash function, or other type of integrity check function. In one embodiment of step 516, includes computing a data value and then comparing it against other previously computed hash values on the computing device or on the trusted source. Comparing this computed data value to other previously computed hash values determines whether there is a corresponding hash value in order to validate the integrity of the application data. After validation, the second decrypted application data may be executed. In further examples, if there has been no validation of the integrity, the application data may be removed from the memory or will not execute the application data. At step 518, status update of the second decrypted application data is received. Step 518, by way of example, may receive directions for the current status of the second decrypted application data from the trusted source. This may include to recall the application data, update the application data, hold, execute the application data, and/or other type of status. For example, after validating the integrity at step 516, the computing device may receive from the trusted source the status update to recall the application data since the user may no longer be authorized to execute and operate that particular application. Thus, at step 518, the application data would be deleted.

At step 520, the second decrypted application data is executed. Step 520, by way of example, the computing device 102 executes the second decrypted application data after validating the integrity and receiving an update status to execute the application. A further example of step 520 includes launching the application data, the configurable files, and executable files for operation of an application program.

At step 522, the second decrypted application data is terminated. Step 522, by way of example, removes all associated decrypted components of the application program from the memory. A further example of step 522 is to receive a request to terminate the second decrypted application file and remove the second decrypted application file from memory. For example, the user of the computing device may choose to end the session of an application and close it. The computing device receives a request to terminate the second decrypted application file, and then removes it from the memory.

Figure 6:
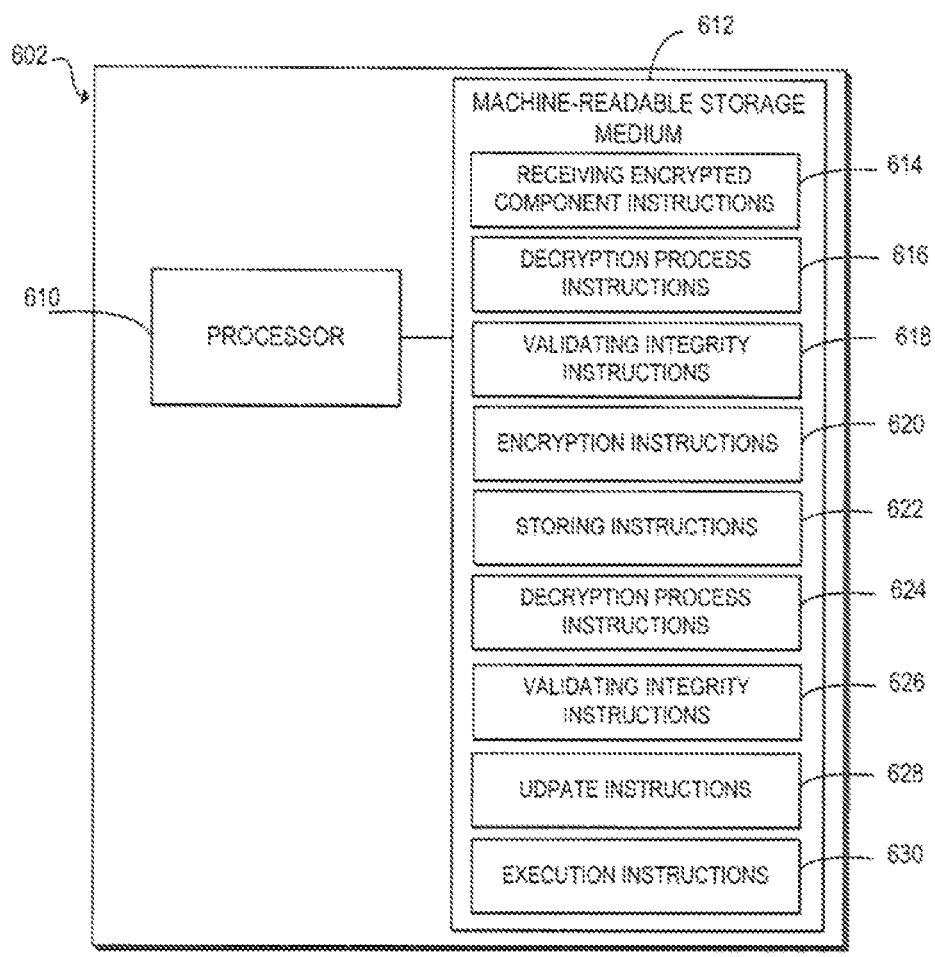
FIG. 6 is a block diagram of an example computing device for receiving an encrypted component to execute.

Referring now to FIG. 6, a block diagram of an example computing device 602 for storing and execution of a second application data. Although computing device 602 includes processor 610 and machine-readable storage medium 612, it may also include other components that would be suitable to one skilled in the art. For example, the computing device 602 may also include a storage area, and/or additional processor, input device, etc. Additionally, computing device 602, by way of example, may include a client device, personal computer, laptop, mobile device, portable device, or any other computing device suitable for receiving and storing an encrypted application data.

Processor 610 may fetch, decode, and execute instructions 614, 616, 618, 620, 622, 624, 626, 628, and 630. Processor 610 may include a central processing unit (CPU), microprocessor, or other programmable device suitable to decrypt, validate, encrypt, store, update, and execute the application data. Specifically, the processor 610 executes receiving a first encrypted application data instructions 614, decryption process instructions 616, validating the integrity instructions 618 of the first decrypted application data, encryption instructions 620 to generate a second encrypted application data, and storing instructions 622. Additionally, the processor 610 retrieves the second encrypted application data from a memory to execute decryption process instructions 624, validating the integrity instructions 626 of the second decrypted application data, update instructions 628, and execution instructions 630.

Machine-readable storage medium 612 may include instructions 614, 616, 618, 620, 622, 624, 626, 628, and 630 for the processor 610 to fetch, decode, and execute. The machine-readable storage medium 612 may be an electronic, magnetic, optical, memory, flash-drive, or other physical device that contains or stores executable instructions. Thus, machine-readable storage medium 612, may be, for example, Random Access Memory (RAM), an Electrically Erasable Programmable Read-Only memory (EEPROM), a storage drive, a Compact Disc Read Only Memory (CD-ROM), and the like. As such, the machine-readable storage medium 612 may be non-transitory. In other embodiments, the computing device 602 can include an application and/or firmware which can be utilized independently and/or in conjunction with the processor 610 to fetch, decode and/or execute the instructions on the machine-readable storage medium 612. The application and/or firmware can be stored on the machine-readable storage medium 612 and/or stored on another location of the computing device 602.

The embodiments described in detail herein to prevent unauthorized use of application and provide a mechanism for security to applications and users of computing devices by reducing malicious tampering with application software.

We claim:

1. A method for preventing unauthorized access to application data comprising: receiving, from a trusted source at a trusted source location, a first encrypted application data at a computing device at a first location, wherein the trusted source uses a first encryption technique at the trusted source location; decrypting, the first encrypted application data received at the computing device from the trusted source to generate a first decrypted application data on the computing device; validating an integrity of the first decrypted application data on the computing device by computing a data value from the first encrypted application data and comparing the data value to a stored value on the trusted source; encrypting, at the first location, the first decrypted application data on the computing device with an encryption technique different from the first encryption technique used for the first encrypted application data to generate a second encrypted application data, wherein the encryption technique on the computing device is an encryption program which uses a key specific to a user of the computing device; storing the second encrypted application data on a memory of the computing device; decrypting the second encrypted application data to generate a second decrypted application data; and executing the second decrypted application data on the computing device; validating the integrity of the second decrypted application data; and receiving a status update of the second decrypted application data from the trusted source.

2. The method of claim 1, wherein receiving the status update of the second decrypted application includes at least one of non-executable, recall, requires update, and hold.

3. The method of claim 1, further comprising: terminating the second decrypted application data by removing one or more files associated with the second decrypted application data from the memory of the computing device.

4. A computing device at a first location, the computing device comprising: a communication platform to: receive from a trusted source a first encrypted application data wherein the trusted source uses a first encryption at a trusted source location, wherein the trusted source location is different than the first location; a processor to: decrypt the first encrypted application data to provide a first decrypted application data; validate an integrity of the first decrypted application data by computing a data value from the first encrypted application data and comparing the data value to a stored value on the trusted source; encrypt, at the first location, the first decrypted application data with a second encryption different from the first encryption to provide a second encrypted application data, wherein the second encryption is an encryption program which uses a key specific to a user of the computing device; and a memory to store the second encrypted application data, wherein the processor: decrypts the second encrypted application data to generate a second decrypted application data; and executes the second decrypted application data on the computing device; retrieves the second encrypted application data from the memory; validate the integrity of the second decrypted application data; and receive a status of the second decrypted application data from the trusted source.

5. The computing device of claim 4, wherein to decrypt the first encrypted application data, the processor is additionally to:
receive an encryption key from the trusted source;
encrypt the encryption key; and
store the encryption key.

6. The computing device of claim 4, wherein the application data includes at least one executable file, configuration file, media, library, metadata, source code, or other software related application file.

7. The computing device of claim 4, wherein to retrieve the second encrypted application data from the memory includes the processor responding to a user initiated request.

8. The computing device of claim 4, further comprising a memory for the processor to: cache the second decrypted application data into the memory; receive a request to terminate the second decrypted application data; and remove the second decrypted application data from the memory.

9. A non-transitory machine-readable storage medium comprising instructions that if executed cause a processor to: receive at a computing device at first location a first encrypted application data, encrypted with a first encryption at a location of a trusted source that is different than the first location; decrypt the first encrypted application data based on a received encryption key to generate a first decrypted application data; validate an integrity of the first decrypted application data by computing a data value from the first encrypted application data and comparing the data value to a stored value on the trusted source; generate at the computing device a second encrypted application data by encrypting, at the first location, the first decrypted application data with a second encryption different from the first encryption method, wherein the second encryption is an encryption program which uses a key specific to a user of the computing device; store the second encrypted application data in a memory of the computing device decrypt the second encrypted application data to generate a second decrypted application data; and execute the second decrypted application data on the computing device; wherein if executed cause the processor additionally to: validate the integrity of the second decrypted application data; and receive a status update from the trusted source for the second decrypted application data.

\* \* \* \* \*